US010094397B2

(12) United States Patent
Schwab et al.

(10) Patent No.: US 10,094,397 B2
(45) Date of Patent: Oct. 9, 2018

(54) OPTICAL SENSOR, IN PARTICULAR FOR A CYLINDER, AND APPLICATION

(71) Applicant: Weber-Hydraulik GmbH, Guglingen (DE)

(72) Inventors: Christian Schwab, Sternenfels (DE); Volker Jahn, Heidesee (DE); Marcus Schinkel, Bestensee (DE)

(73) Assignee: Weber-Hydraulik GmbH, Güglingen (DE)

( * ) Notice: Subject to any disclaimer, the term of this patent is extended or adjusted under 35 U.S.C. 154(b) by 203 days.

(21) Appl. No.: 15/267,532

(22) Filed: Sep. 16, 2016

(65) Prior Publication Data

US 2017/0074296 A1    Mar. 16, 2017

(30) Foreign Application Priority Data

Sep. 16, 2015 (DE) .................... 10 2015 115 651
Oct. 5, 2015 (DE) .................... 10 2015 116 911
(Continued)

(51) Int. Cl.
*F15B 15/28* (2006.01)
*F15B 15/14* (2006.01)
(Continued)

(52) U.S. Cl.
CPC ...... *F15B 15/2846* (2013.01); *F15B 15/1457* (2013.01); *F15B 15/2876* (2013.01);
(Continued)

(58) Field of Classification Search
CPC ............. F15B 15/1457; F15B 15/2846; G01D 5/34761; G01D 5/34746
See application file for complete search history.

(56) References Cited

U.S. PATENT DOCUMENTS 6,834,574 B2 * 12/2004 Neumann ........... F15B 15/2846
                                                                    91/1
7,047,865 B2 *  5/2006 Neumann ........... F15B 15/2846
                                                                    91/1
(Continued)

FOREIGN PATENT DOCUMENTS

AT      511883      3/2013
DE    10014194      1/2001
DE    10242630      3/2004

*Primary Examiner* — Thomas E Lazo
(74) *Attorney, Agent, or Firm* — Volpe and Koenig, P.C.

(57) ABSTRACT

A sensor (S) is provided for determining the stroke of the piston rod (6) of a fluid cylinder, particularly a hydraulic or pneumatic cylinder. The sensor includes a lighting unit for illuminating a code applied on the surface of the piston rod and differing from said surface by color, a first camera unit with a first lens system for recording a first image of the illuminated code in a first scanning window, an evaluation unit for evaluating output signals of the first camera unit, and an interface for issuing the evaluated output signals as information regarding the position of the piston rod. Additionally, a second redundant camera unit is provided with a second lens system, which serves for recording a second image of the illuminated code in a second scanning window. According to the invention the second camera unit is arranged such that the second scanning window is spaced apart in the direction of the extension of the piston rod by a predetermined value from the first scanning window of the first camera unit. The output signals of the second camera unit are evaluated in an evaluation unit as information about the respective position by forming a difference, with in case of said difference being consistent with a predetermined value the output signal being considered information about the stroke of the piston rod, and in case of inconsistency of the difference with the predetermined value an error message being issued.

11 Claims, 4 Drawing Sheets

(30) Foreign Application Priority Data

| Oct. 26, 2015 | (DE) | .................... 20 2015 107 093 U |
| Oct. 30, 2015 | (DE) | ........................ 10 2015 118 681 |
| Nov. 5, 2015 | (DE) | ........................ 10 2015 119 034 |
| Dec. 8, 2015 | (DE) | ........................ 10 2015 121 386 |
| Dec. 10, 2015 | (DE) | ........................ 10 2015 121 571 |

(51) Int. Cl.
    *G01D 5/244*     (2006.01)
    *G01D 5/347*     (2006.01)
    *G01B 11/02*     (2006.01)

(52) U.S. Cl.
    CPC ......... *G01B 11/02* (2013.01); *G01D 5/24461* (2013.01); *G01D 5/347* (2013.01); *G01D 5/34792* (2013.01)

(56) References Cited

U.S. PATENT DOCUMENTS

| 7,178,446 B2* | 2/2007 | Kucher | ............... F15B 15/2807 |
| | | | 91/1 |
| 7,552,671 B2* | 6/2009 | Neumann | .......... G01D 5/34761 |
| | | | 91/1 |
| 2016/0177981 A1* | 6/2016 | Maglione | ........... G01D 5/34746 |
| | | | 92/5 R |

* cited by examiner

*: If recognizable as Position
ΔL: Distance between Sensors

OPTICAL SENSOR, IN PARTICULAR FOR A CYLINDER, AND APPLICATION

FIELD OF THE INVENTION

The present invention relates to the technical field of optical sensors, particularly optical position sensors, for example fluid cylinders, such as for hydraulic or pneumatic cylinders.

BACKGROUND

For measuring the actual length of fluid cylinders, particularly hydraulic or pneumatic cylinders, there are various technical options available; in particular there are various ways of stroke measurement in a cylinder using sensors, with the sensors being classified as internal sensors and external sensors.

In case of internal sensors the stroke is measured inside the cylinder. Here, for example magnetostrictive sensors, magnetic field sensors, or in case of larger cylinders also cable sensors are used. The advantage of internal sensors is given in that they are very well protected from external influences; however, the expense for integrating them in the cylinders is high. Additionally, the installation is only possible at a certain minimum size, and the length of the completely retracted cylinder (block length) is increased.

Examples for external sensors are cable sensors, laser sensors, magnetic field sensors, or magnetic tapes. Also included in the group of external sensors are here the indirect length measurements, for example by angular or rotary encoders at components moved by the cylinder. These sensors are advantageous in that the construction of the cylinder remains largely unaffected.

Furthermore, it is distinguished between incremental measuring methods and absolute measuring methods:

Incremental length measurements, starting from a reference value, count measuring pulses each of which representing a defined distance. Without any battery buffering, after each loss of voltage, for example when the machine was shut off, the reference position must be assumed anew.

Absolute length sensors are capable of determining the position based on the presently given measurement at any point of time without here being required to assume a reference position if such an assumption of a reference position is or is not possible depends on the respective application and the individual use of the machine).

For example, it is known from prior art to arrange two or more individual sensors about a piston rod. Such sensors, arranged radially in reference to the longitudinal extension of the piston rod, must be connected to each other, on the one hand, and require relatively much space, on the other hand, thus they result in a large design. Furthermore, in case of two (or more) radially arranged individual sensors only the same code position can be detected so that any faulty code, particularly a faulty barcode or a missing barcode, cannot be detected with a certain probability.

SUMMARY

The invention is based on the objective of providing an improved sensor system for determining the stroke of a piston rod of a fluid cylinder.

This objective is attained in a sensor having tone or more the features of the invention described below. Advantageous embodiments and beneficial further developments of the present invention are disclosed in the respective dependent claims.

The optical position sensor according to the present invention serves for the measurement of the length of the cylinder based on the optical detection of a binary barcode applied on the piston rod of a cylinder comprising an absolute code structure. In order to meet increased safety requirements, here a redundant embodiment of the sensor, particularly comprising two or more channels, can be provided, preferably inside a housing.

The optical positioning sensor according to the present invention is embodied as a linear sensor, particularly as an absolute length sensor. In order to realize the principle of absolute length measurement the code is advantageously designed in an unambiguously continuous fashion. Each change of position by maximally one barcode width therefore leads to an unambiguous code word, particularly over the entire path measured. By way of interpolation of distances smaller than the width of the bars, here intermediate positions can be determined; this way the resolution of the sensor is increased.

The present invention is here based on an optic measuring principle. For this purpose, the code applied on the piston rod is detected by the sensor and evaluated in order to determine therefrom the presently given position of the piston rod. The code particularly represents a binary barcode, which is applied on the surface of the piston rod. The code differs in color from the coating, particularly the hard chromium coating of the piston rod and forms here a contrast as striking as possible.

The sensor comprises a lighting unit for illuminating a code applied on the surface of the piston rod, showing a different color than the rod, a first camera unit with a first lens system for recording a first image of the illuminated code in a first scanning window, an evaluation unit for evaluating output signals of the first camera unit, and an interface for issuing the evaluated output signals as information regarding the position of the piston rod. Additionally, a second, redundant camera unit with a second lens system is provided, which serves for recording a second image of the illuminated code in a second scanning window. According to the invention, the second scanning window is spaced apart in the direction of extension of the piston rod from the first scanning window of the first camera unit by a predetermined length. The output signals of the second camera unit are processed in the evaluation unit as information regarding the respective position, here forming the difference thereof, with the consistency of the difference with the certain value of the output signal being issued as information regarding the stroke of the piston rod, and in case of inconsistency of the difference with the certain value an error message being issued.

Therefore, the sensor has a lighting unit, a first camera unit for imaging, and an electronic for image processing and communication. The lighting unit briefly illuminates a section of the code and subsequently said section is detected by the camera unit. This occurs in intervals adjusted to the maximum displacement speed. Preferably the illumination period and/or recording period for imaging is adjusted to the maximum displacement speed in order to avoid blurring due to motion. The images are evaluated individually and the position of the piston rod is then determined therefrom.

Therefore, both camera units each record a comprehensive image of the section of the piston rod located in the respective recording window, thus the respective detection sections and accordingly the code pattern located thereon.

The code pattern is preferably designed such that each code section allows an unambiguous determination of an absolute position of the piston rod based on the length of the scanning window, thus based on each code word.

According to the invention, here error detection and plausibility tests occur inside the sensor itself. This way the sensor is capable to detect errors and issue an error message if necessary.

Additionally, preferably both camera units share a common lighting unit, so that the sensor can be designed in a compact and cost-effective fashion.

In an advantageous embodiment of the present invention the first lens system and the second lens system are arranged in a common optic housing. Here, the two lens systems each may have separate lens fasteners, and the separate lens fasteners with the respective lens systems are arranged in the common optic housing and are fixed and positioned thereby.

Due to the fact that the lens systems define and/or predetermine the corresponding scanning windows, the absolute arrangement of the lens systems is important here, but particularly also the relative arrangement of the lens systems in reference to each other. By locating the two lens systems in a common optic housing the relative arrangement is precisely predetermined, the absolute positioning of the lens systems is simplified in reference to the piston rod.

It is particularly possible by the precise positioning of the lens systems in the optic housing to perform a determination of a position with greater precision than the width of the bars of the code pattern. An interpolation occurs for example such that it is determined by how many pixels a code bar is displaced within the respectively recorded image, thus with regard to the corresponding measuring window of the respective camera unit, in reference to the position ("zero position") allocated to the detected code word. The number of image pixels, by which the recorded code word and/or its first code bar is displaced in reference to this zero position, and conclusions can be drawn regarding the exact, i.e. pixel-precise position of the piston rod.

According to another preferred embodiment of the present invention the actual photosensitive sensor elements of the two camera units can be arranged on a common circuit board. This measure allows a precise relative positioning of the photosensitive sensor elements in reference to each other as well as regarding the lens systems accepted in a common optic housing.

According to an advantageous embodiment of the present invention the sensor can be fastened at the guidance part and operate outside the pressure chamber, but downstream of the scraper. The sensor can therefore be considered an external sensor, which however is largely integrated in the construction of the cylinder, and with its installation potentially being adjusted to the respective application.

For example, in many cases the sensor can be realized without any enlargement of the length of the block. Simultaneously the sensor is protected from manipulations, because any circumventing or influencing from the outside is impossible, for example by mechanically severing it from the system.

Here, it is particularly advantageous when the second camera unit is arranged such that the first and the second scanning window overlap each other. This way the sensor can be designed in a particularly compact and space-saving fashion so that the length of the cylinder equipped with the sensor according to the invention increases only insignificantly, at the most.

According to a preferred further development of the present invention, in addition to at least two camera units, arranged linearly in reference to the longitudinal extension of the piston rod, at least one camera unit may be provided, arranged radially in reference to the longitudinal extension of the piston rod, for example in order to detect errors when the bars of the code are provided over the entire circumference of the piston rod.

In this context it is also possible to arrange at least two camera units radially and additionally axially slightly offset in reference to each other over the longitudinal extension of the piston rod, with these two or more camera units beneficially being located inside a housing (→compact, space-saving design) or in separate individual housings.

According to a preferred embodiment of the present invention the circuit board, on which the two photosensitive sensor elements of the camera units are arranged, can at least essentially be arranged parallel in reference to the longitudinal extension of the piston rod.

According to an alternative embodiment of the present invention the circuit board may also be fastened in a tilted fashion, for example inclined by approximately twenty degrees in reference to the longitudinal extension of the piston rod, in order to allow measuring the apex. Such an angular positioning or diagonal installation of the circuit board in reference to the extension of the piston rod therefore allows a determination of the stroke of the piston rod independent from its diameter.

The maximally possible measuring length depends on the width of the scanning window and on the width of the bars of the code. This determines how many bits of the code can be scanned. Furthermore, additional restrictions may be given, such as a maximum number of bars of identical color side by side, for example, or a distribution of brightness over the scanning window as evenly as possible. Additionally it must be ensured that the barcode sections are not repeated over the width scanned. An exemplary measuring length may amount to approximately 4.500 millimeters, for example.

For safety-sensitive data transmission, for example CANopen safety may be provided as interfaces to the system of the user, with the CANopen safety protocol (CiA 304) having been published as a European standard (EN) ISO 50325-5. Alternatively or additionally, analog interfaces may also be used, here. Furthermore, other CAN-protocols specific for the user or other digital transmission standards may be implemented.

An exemplary width of the one-channel sensor may amount to 30 millimeters for example, the one of a sensor showing two or more channels approximately 35 millimeters.

An exemplary length of the sensor (having one or more channels) may amount to approximately 60 millimeters.

An exemplary height of the sensor (having one or more channels) may amount to approximately 30 millimeters.

An exemplary distance of the sensor (having one or more channels) from the piston rod may amount to approximately 9 millimeters.

Using the sensor according to the present invention allows not only to yielding savings with regards to structural space and costs, but also technical advantages, because according to the invention fewer critical points result here, such as sealing contacts or electric connections.

For the lasting function of the sensor according to the present invention, a robust and resilient marking of the piston rod is important, for example applied by lasers. Here, the marking shall be able to withstand mechanical influences by guide belts and gaskets, as well as by chemical influences, the weather, and UV-radiation. Additionally, the piston rod made from steel must be protected from corrosion underneath the markings.

In a beneficial fashion the marking, particularly a hard-chromed surface, shows strong contrast in order to allow the sensor according to the invention a secure detection thereof. For this purpose the respective code sections can also be coated, perhaps additionally and selectively with black chrome, black nickel, black rhodium, black ruthenium, copper-tin alloy, copper-tin-zinc alloy, or gold, particularly hard gold. For example, black chromium appears almost black and is chemically as well as mechanically resistant to exterior influences.

Based on its robustness and resistance, particularly towards effects of dust, impact, and/or lateral stress, and in light of the simple integration in the cylinder, the optical position measuring system according to the present invention is suitable for many applications, in which the stroke and/or the length of the cylinder shall be measured for controlling and/or safety functions.

BRIEF DESCRIPTION OF THE DRAWINGS

As already explained above, there are various options to advantageously implement the teaching of the present invention and to further develop it. For this purpose, additional embodiments, features, and advantages of the present invention are explained in greater detail based on the exemplary embodiments illustrated in FIGS. 1A to 3B.

Shown are.

Identical or similar embodiments, elements, and features are provided with identical reference characters in FIGS. 1A to 4.

DETAILED DESCRIPTION OF THE PREFERRED EMBODIMENTS

Figure 1A:
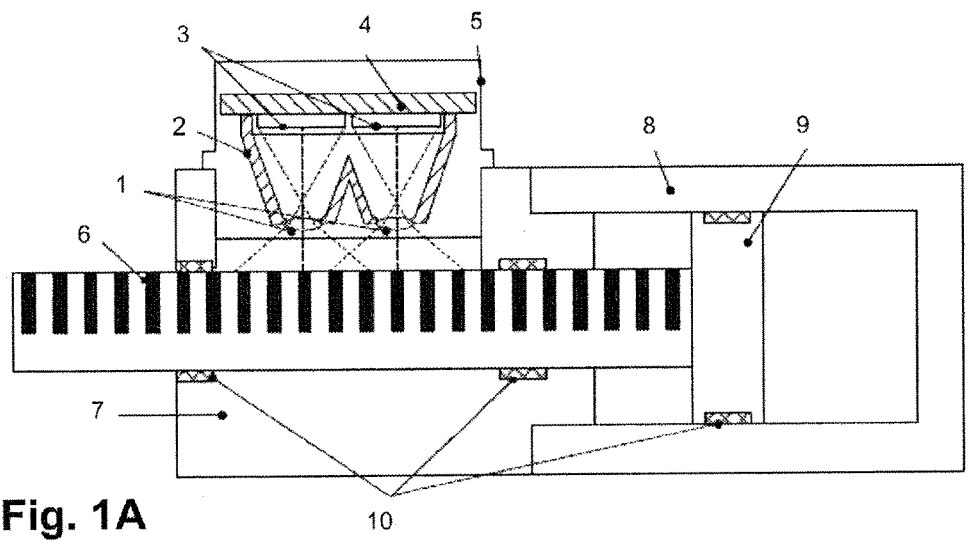
FIG. 1A in a schematic illustration of the concept, a first exemplary embodiment for the sensor according to the invention, which operates based on the principle of absolute length measurement of the present invention.

A preferred exemplary embodiment of the present invention is illustrated based on FIG. 1A.

The sensor S comprises a lighting unit and two camera units, in addition to an integrated or allocated evaluation unit, particularly an evaluation electronic, which may be realized for example via a DSP or CPU. Each of the two camera units, essentially arranged linearly in reference to the longitudinal extension of a piston rod 6, comprises a lens system 1 and a photosensitive sensor element 3 arranged on a circuit board 4, with the lens system 1 and the sensor element 3 being provided in an optic housing 2. Optic housings 2 and circuit boards 4 are in turn arranged in a housing 5. The sensor elements 3 are particularly embodied as CCD-image sensors (CCD: charge-coupled device), which comprise a matrix of light-sensitive elements, such as photodiodes, and which can record a two-dimensional image.

The two cameras arranged axially at a distance from each other by a distance ΔL detect the absolute barcode on the piston rod 6 (located underneath thereof in FIG. 1A) and this way they determine the presently given position of the piston rod 6 independently from each other.

In the exemplary illustration according to FIG. 1A the circuit board 4 is arranged at least essentially parallel in reference to the longitudinal extension of the piston rod 6.

Figure 1B:
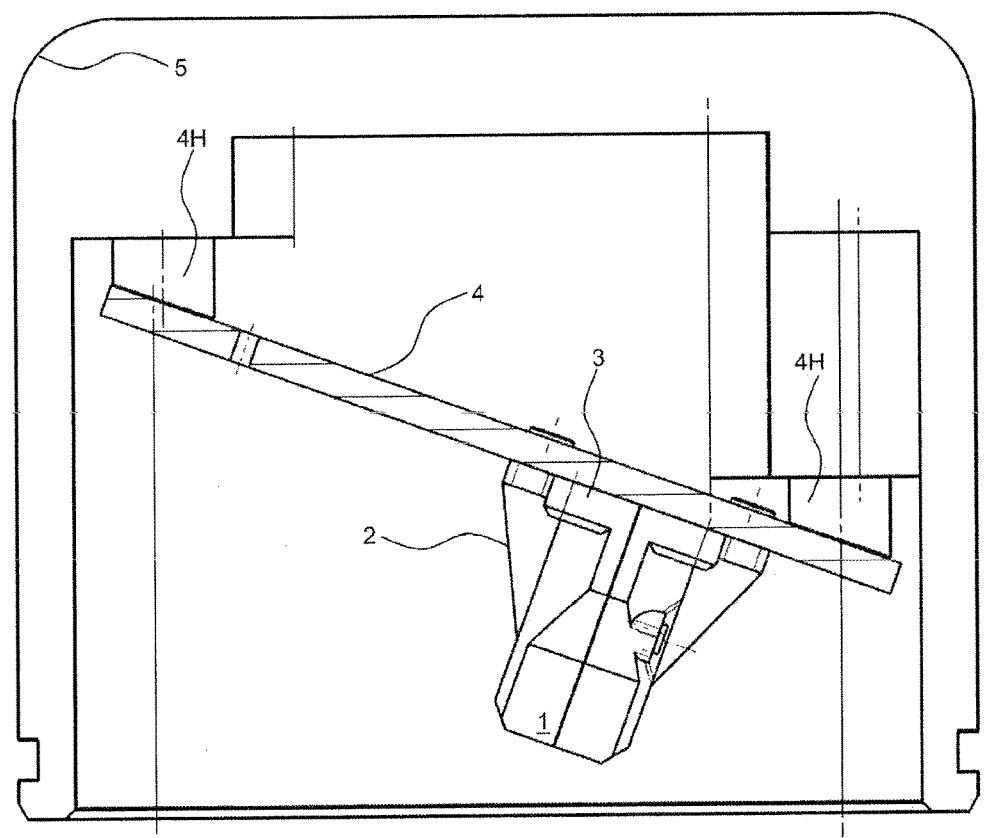
FIG. 1B in a schematic illustration of the concept, an enlarged illustration of a second exemplary embodiment for the sensor according to the present invention, which operates according to the principle of absolute length measurement of the present invention.

According to an alternative embodiment of the present invention, illustrated in FIG. 1B, the circuit board 4 can be arranged inside the housing 5 in an inclined fashion in reference to the longitudinal extension of the piston rod 6 (not shown in FIG. 1B for reasons of clarity of the illustration), for example inclined by approximately twenty degrees (FIG. 1B showing only one camera unit for reasons of clarity of the illustration).

Such a diagonal design, i.e. angled position of the circuit board 4 in reference to the piston rod 6, allows measuring the apex of the piston rod 6, this means the stroke of the piston rod 6 is determined independently from its diameter.

Figure 1C:
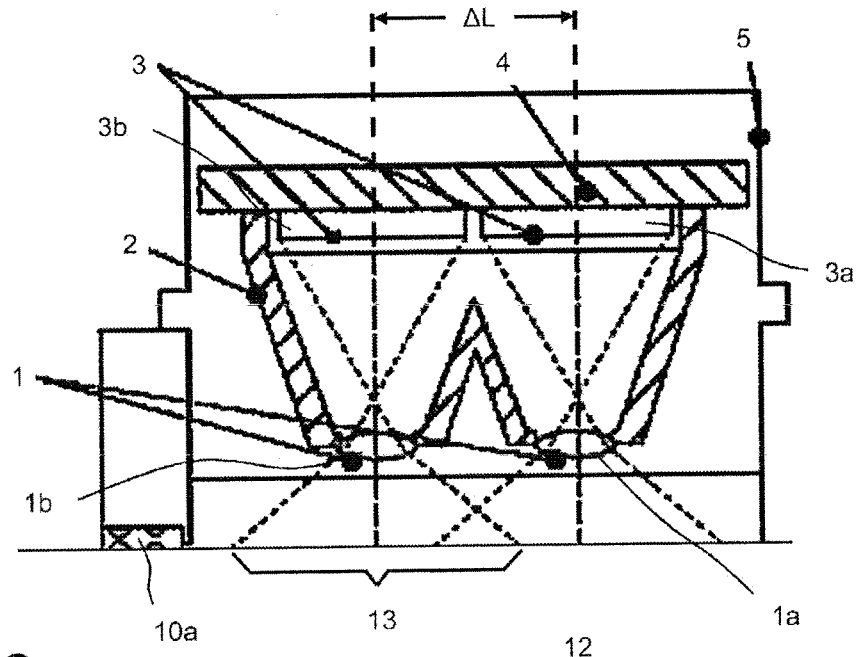
FIG. 1C a detail of FIG. 1A, which shows the sensor with the two redundant camera units in an enlarged illustration.

FIG. 1C shows the sensor illustrated in FIG. 1A once more in an enlarged fashion for better understanding. Here, the sensor element of the first camera unit abutting the cylinder head of the fluid cylinder 8 is marked with the reference character 3a and the sensor element of the second, redundant camera unit is marked with the reference character 3b. Accordingly, the right lens system at the right in FIG. 1C is marked 1a and the left lens system is marked 1b. The dot-dash lines show schematically the radiation path of the optical illustration generated by the respective lens system 1a, 1b. The lens system 1a forms the detection range 12 on the image sensor 3a, which is equivalent therefore to the scanning window of the first camera unit. Accordingly, the second lens system 1b displays the detection range 13 on the image sensor 3b. This is therefore equivalent to the scanning window of the second camera unit.

The distance ΔL is equivalent to the distance of the two scanning windows 12, 13 and can be measured in the center of the scanning window or also its respectively right or left edge. Due to the fact that the two sensor elements 3a, 3b are also located in the optic axis of the lens systems 1a, 1b and are thus also offset on the circuit board 4 by the distance ΔL (measured e.g., in the respective center of the two otherwise identical sensor elements 3a, 3b). The optic housing 2, in which the two lens systems 1a, 1b are arranged in appropriate seats, is fastened above the two sensor elements 3a, 3b on the circuit board 4. The gasket 10a, located about the piston rod 6, and preferably allocated to the sensor housing 5, prevents the penetration of contaminants into the sensor housing 5.

Figure 2:
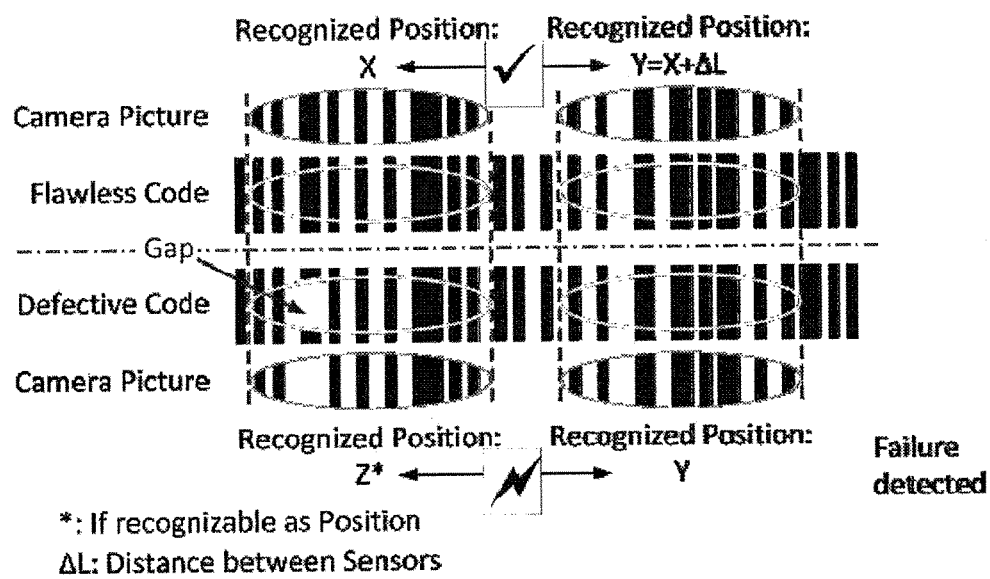
FIG. 2 a schematic illustration of the concept, visualizing the safety principle implemented in the present invention.

An essential advantage of the redundant sensor S, here comprising various integrated plausibility checks, according to FIG. 1 or according to FIG. 1B therefore also results from a safety analysis according to FIG. 2 (here, indicating "recognized position"

"camera picture"

"flawless code"
"gap"
"defective code"
"if recognizable as position"
"distance between sensors"
"failure detected").

If for example values measured successively deviate from each other in a non-plausible fashion, an error message is generated and issued. For safety-critical applications, for example for braking or steering systems, this way of checking is frequently insufficient, though.

For this purpose, the redundant system according to the invention is available in which the two sensor units are integrated in the same housing 5. The housing 5 is only slightly greater in the sensor S according to the invention showing two or more sensors than in the one-channel sensor. For this purpose the overall system is considerably more space-saving and here no increased expense is required for wiring.

Both sensors are arranged side-by-side in the longitudinal direction. Based on this arrangement the two sensors scan the same code bars, however at different locations and at a fixed predetermined distance ΔL. If the two measurements fail to reflect this distance ΔL, this fact is detected as an error.

Scanning the barcode at two axially offset points increases the safety of the sensor S.

If for example a bar is too wide or too narrow due to a faulty marking on the piston rod 6, it could happen that the respective point is misinterpreted and this way a false measurement is issued.

However, if the code is evaluated at two different points, almost all faulty codes can be detected. This way the occurrence of undetectable dangerous errors can be excluded almost entirely.

Furthermore for some errors it is possible to correct such errors, which increases the availability.

Here, the distance ΔL of the two sensors is selected fixed in reference to each other. This way, the requirement must be fulfilled at all times that the two detected positions always deviate from each other by said distance ΔL. If this condition is not met, at least one measurement must have been detected erroneously. This is possible for example when the code is false, soiled, or damaged.

This increases the safety of the issued measurement, because here potential scanning errors are reliably detected. In order for the sensor S to issue a false value, both partial sensors had to detect the false value each simultaneously, and both values detected falsely had to show precisely the distance ΔL from each other. This is very improbable in a suitably designed barcode.

The barcode, which the piston rod 6 is provided with, is evaluated in the longitudinal direction of the piston rod 6 in case of the redundant system according to the present invention simultaneously at two different positions using the evaluation electronic, here for example at the position X and at the position Y=X+ΔL.

If here a position is detected incorrectly, for example by a code applied in a flawed or damaged fashion, (cf. "defective code" in the lower half of FIG. 2), it is immediately detected in a plausibility check.

Due to its design, the reliability of its components, and its safety measures the sensor is suited to meet the requirements according to the European standard (EN) ISO 13849-1.

Figure 3A:
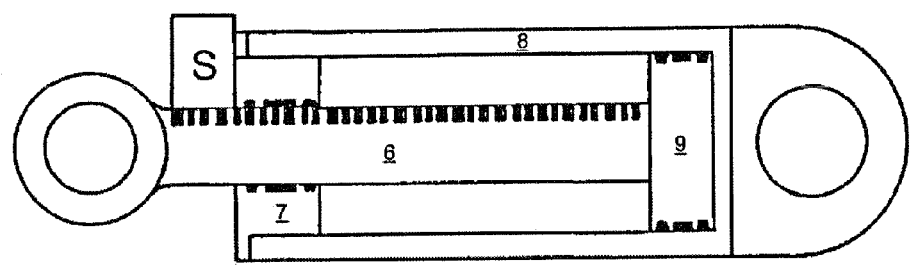
FIG. 3A in a schematic illustration of the concept, an exemplary embodiment for arranging the sensor of FIG. 1A or FIG. 1B in reference to a piston rod provided with a continuous and unambiguous binary barcode.

From the schematic illustration in FIG. 3A it is discernible, for example, that the sensor S can be considered an external sensor, which however is largely integrated in the construction of the fluid cylinder, particularly the hydraulic or pneumatic cylinder, and with its installation potentially being adjusted to the respective application.

Figure 3B:
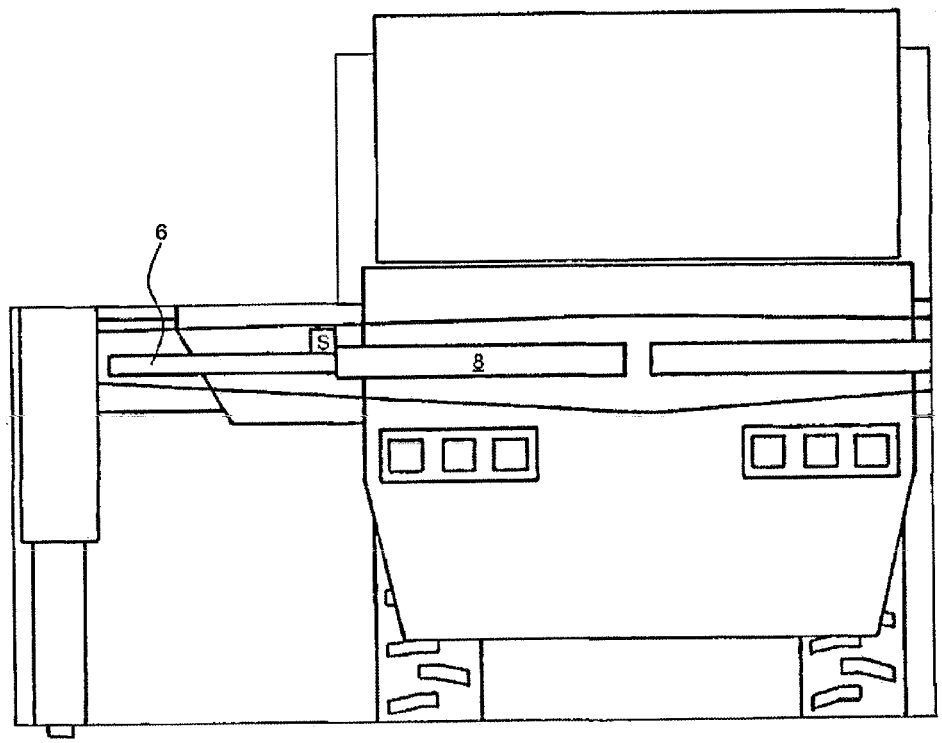
FIG. 3B in a schematic illustration of the concept, an exemplary embodiment for the arrangement of the sensor of FIG. 1A or FIG. 1B and FIG. 3A in the undercarriage of a mobile crane, and FIG. 4 a third exemplary embodiment of a second circuit board, inclined in reference to the camera circuit board, with a LED as the light soured.

Based on its compact dimensions the sensor is particularly suited for the mobile use in machines for agriculture and construction. For example, the sensor according to the present invention can be used in the undercarriage of mobile cranes (cf. FIG. 3B).

The sensor is integrated in the telescopic cylinders of support arms in order to measure the width of said support arm, allowing the determination of the tipping load of the crane.

Figure 4:
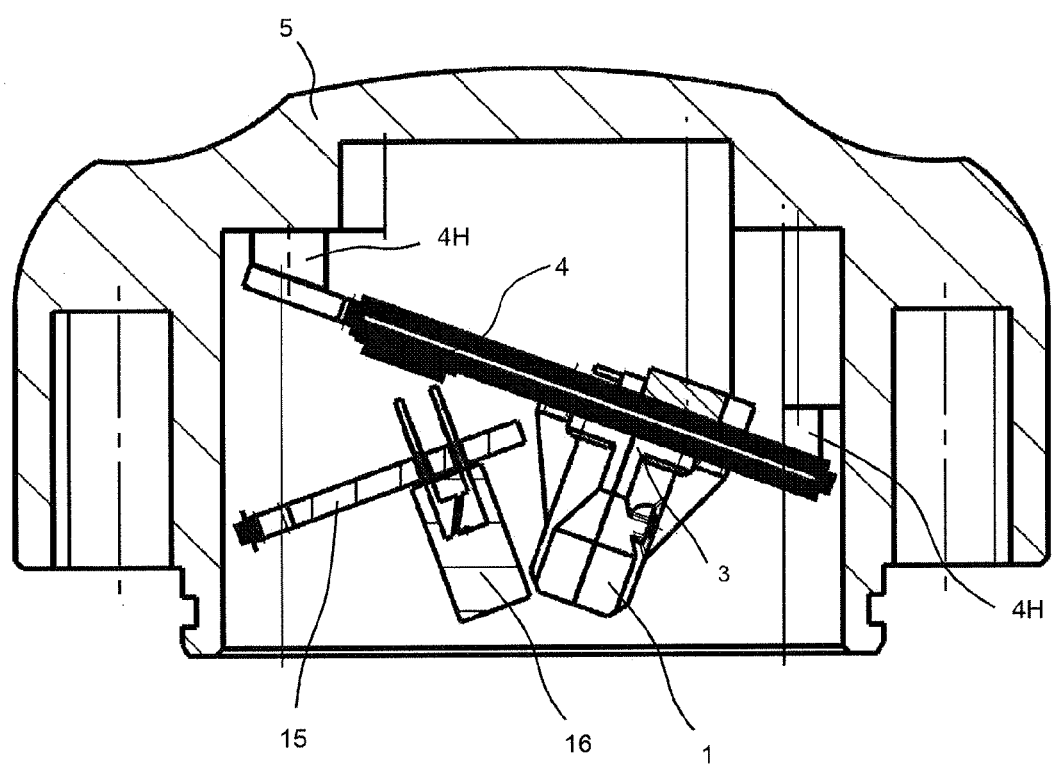

Based on the embodiment shown in FIG. 1B, FIG. 4 illustrates another exemplary embodiment in which a light emitting diode 16 is arranged, serving as a lighting unit on a second circuit board 15. The second circuit board is inclined in the opposite direction compared to the circuit board 4, namely preferably by the same angle as the circuit board 4, so that the radiation path of the incident angle between the light emitting diode 16 and the surface of the piston rod 6 is equivalent to the emergent angle between the piston rod 6 and the camera unit.

Similar to FIG. 1B, FIG. 4 also shows only one camera unit. The second one is arranged offset in the drawing plane and covered by the first one.

The invention claimed is:

1. A sensor (S) for determining a stroke of a piston rod (6) of a fluid cylinder (8), the sensor (S) comprising:
    a lighting unit for illuminating a code applied on a surface of the piston rod (6) and differing therefrom in color,
    a first camera unit (1a, 3a) with a first lens system (1a) for recording a first image of the illuminated code in a first scanning window (12),
    an evaluation unit for evaluating output signals of the first camera unit (1a, 3a),
    an interface for emitting an evaluated output signal as information regarding a position of the piston rod (6), and
    a second camera unit (1b, 3b) with a second lens system (1b) for recording a second image of the illuminated code in a second scanning window (13),
    wherein the second camera unit (1b, 3b) being arranged such that the second scanning image (13) is spaced apart in a direction of extension of the piston rod (6) by a predetermined value (ΔL) from the first scanning window (12) of the first camera unit (1a, 3a), and output signals of the second camera unit (1, 3b) being evaluated in the evaluation unit as information regarding a respective position when forming a difference, with
    in case the difference is consistent with the predetermined value (ΔL) the output signal is provided as information regarding the stroke of the piston rod (6), and
    in case the difference is not consistent with the predetermined value (ΔL) an error message is issued.

2. The sensor according to claim 1, wherein the first lens system and the second lens system are arranged in a common optic housing (2).

3. The sensor according to claim 1, wherein the first camera unit (1a, 3a) and the second camera unit (1b, 3b) each comprise a photosensitive sensor element (3a, 3b), with the two sensor elements (3a, 3b) being arranged on a common circuit board (4).

4. The sensor according to claim 1, wherein the second camera unit (1b, 3b) is arranged such that the first and the second scanning window (12, 13) overlap each other.

5. The sensor according to claim 1, wherein the code is at least one of
   embodied as a continuous, unambiguous binary barcode, or
   has a code structure absolutely illustrating the actual stroke of the piston rod (6).

6. The sensor according to claim 1, wherein
   a change of the position of the piston rod (6) by maximally a width of one bar of the code leads to an unambiguous code word and
   intermediate positions, which are smaller than the width of the bars of the code is determined by way of interpolation.

7. The sensor according to claim 1, further comprising at least a third camera unit arranged radially in reference to the direction of extension of the piston rod (6).

8. The sensor according to at least claim 3, wherein the circuit board (4) is arranged essentially parallel in reference to a longitudinal axis of the piston rod (6), or
   arranged inclined in reference to the longitudinal axis of the piston rod (6) by approximately 20 degrees.

9. The sensor according to claim 1, wherein the first camera unit (1a, 3a) and the second camera unit (1b, 3b) are arranged in a common sensor housing (5).

10. A cylinder/piston aggregate comprising: a fluid cylinder (8), a piston (9) longitudinally mobile in the fluid cylinder, a piston rod (6) supported thereby, with a code being applied on a surface thereof differing therefrom in color, and a sensor (S) according to claim 1.

11. A method for determining a stroke or length of a piston rod (6) of a fluid cylinder of a work machine, construction machine, or agricultural machine, comprising: providing a sensor according to claim 1; and evaluating output signals of the first and second camera units to determine the stroke or benefit of the piston rod.

* * * * *